H. B., G. L. AND J. FREEMAN.
VEHICLE.
APPLICATION FILED DEC. 10, 1918.
1,355,221.
Patented Oct. 12, 1920.
2 SHEETS—SHEET 1.
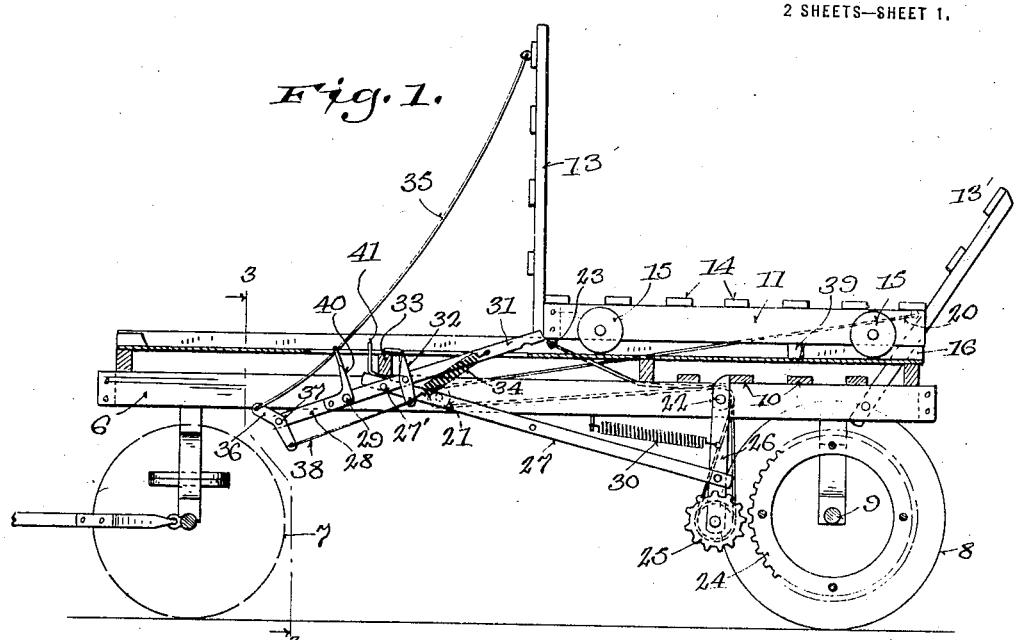
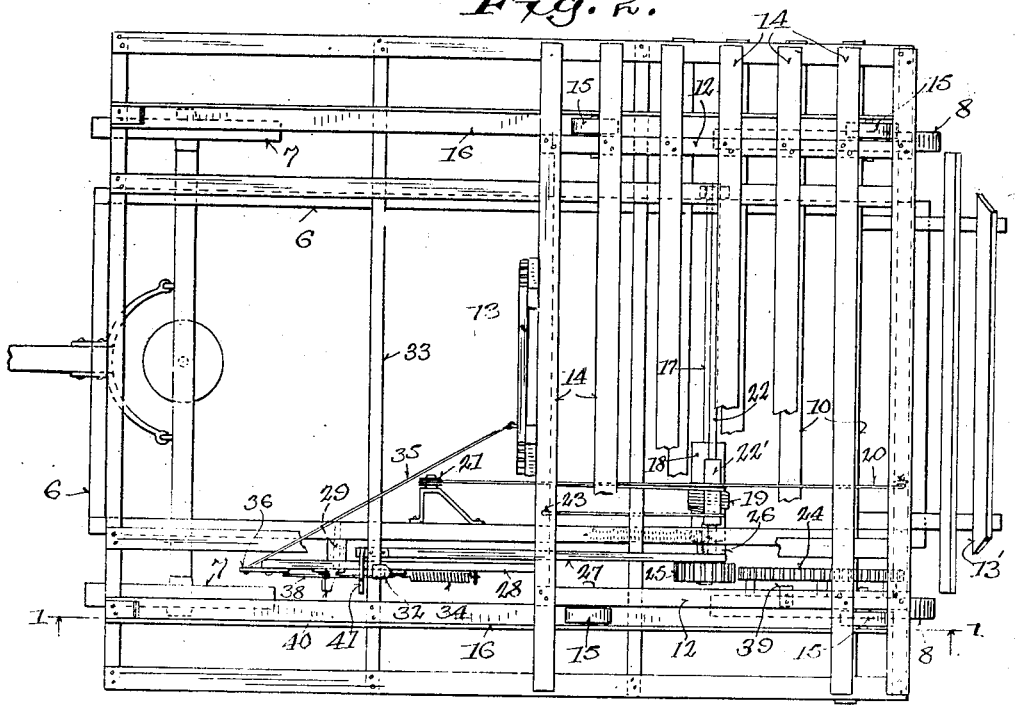

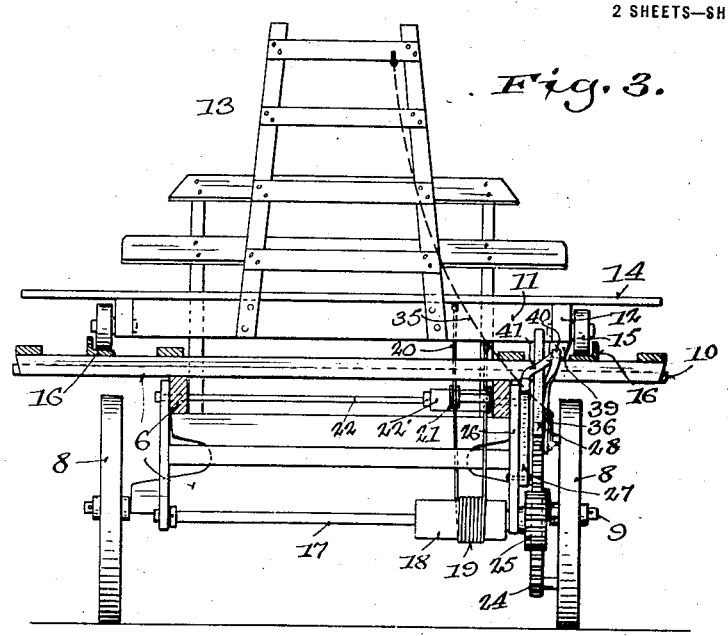

UNITED STATES PATENT OFFICE.

HENRY B. FREEMAN, GEORGE L. FREEMAN, AND JOHN FREEMAN, OF WRIGHTSTOWN, WISCONSIN.

VEHICLE.

1,355,221.  Specification of Letters Patent.  Patented Oct. 12, 1920.

Application filed December 10, 1918. Serial No. 266,025.

*To all whom it may concern:*

Be it known that we, HENRY B. FREEMAN, GEORGE L. FREEMAN, and JOHN FREEMAN, citizens of the United States, and residents of Wrightstown, in the county of Brown and State of Wisconsin, have invented new and useful Improvements in Vehicles, of which the following is a description, reference being had to the accompanying drawings, which are a part of this specification.

The invention relates to vehicles for hauling hay, grain and the like, and its general object is to improve devices of this character in the matter of saving labor.

The invention is further designed to provide a vehicle for hauling hay which may be successfully used with an automatic hay loader with the minimum use of labor.

The invention further consists in the novel parts and combinations of parts hereinafter described and explained and shown in the accompanying drawings in which:

Figure 1 is a vertical sectional view of the device showing it in load-receiving position; Fig. 2 is a plan view of the device, parts being broken away; Fig. 3 is a section taken on the line 3—3 of Fig. 1; Fig. 4 is a view similar to Fig. 1, showing the device during movement to second position; Fig. 5 is a view similar to Fig. 1 showing the device in second position.

In the drawings, the numeral 6 designates generally the body frame of the vehicle provided with front wheels 7 and rear wheels 8 mounted on the rear axle 9.

The hay or grain is received upon a two part platform consisting of a fixed platform formed of frame members 10 secured to the frame 6 at the rear half of the vehicle, and a movable platform 11.

The movable platform 11 consists of side frame members 12, ladder 13 and frame members 14 and is provided with wheels 15 running in angled tracks 16 mounted on the body of the vehicle. This platform is of a size to receive about half the load and is movable over the fixed platform in the rear to receive its load after which it may be moved forward and the rear platform loaded. With this construction one man standing on the movable platform when it is in the position shown in Fig. 1 may load up half of the load because he can readily move the hay to the desired position and as soon as this half of the load is in place the platform is moved ahead and the man loads up the rear half, and this may be done where the hay is being moved up onto the vehicle by an automatic loader.

For convenience in moving the platform 11 forward after it has received its load we have provided mechanism which is driven by the movement of the vehicle to move this platform. This mechanism includes a driven shaft 17 carrying a drum 18 upon which is mounted a cable 19, one end 20 of which is secured to one end of the platform 11, the cable then passing over a guide pulley 21, thence over a roller 22' and shaft 22 and around the drum and back over the roller 22' and secured at its other end 23 to the forward end of the platform 11.

The shaft 17 is driven when desired from the rear axle 9 by a gear 24 secured to one of the rear wheels 8 and adapted to mesh with a gear 25 on the shaft 17. To bring the gears 24 and 25 into and out of mesh with each other the shaft 17 is journaled in the lower end of arms 26 which are pivotally mounted at their upper ends upon the shaft 22 and means are provided for swinging these arms consisting of a pair of levers 27 and 28.

The link 27 is pivotally secured at its rear end to the lower portion of one of the arms 26 and has its other end pivotally connected as at 27' to the lever 28 which is pivotally mounted intermediate its ends upon a short shaft or pin 29. A spring 30 secured at one end to one of the arms 26 and at the other to the body of the vehicle normally maintains the gears 24 and 25 out of mesh and the end 31 of the lever 28 in its upper position as shown in Fig. 1 in which instance, when the platform 11 is in its first or load-receiving position at the rear of the vehicle, the end 31 will project up and abut against the front end of the platform 11 and prevent its forward movement and an additional stop is also provided consisting of a finger 32 pivotally mounted on the lever 28 and normally held in engagement with one of the vehicle frame members 33 by a spring 34 secured at one end to said finger and at the other end to said lever.

To move the gear 25 into mesh with the gear 24 a pull rope 35 is secured to a lever 36 pivotally mounted intermediate its ends upon the end 37 of the lever 28 and connected to the finger 32 by means of a link 38 and the rope is connected at one end to the ladder 13 so as to be within easy reach of the operator on the platform. By pulling on the rope 35 the finger 32 is moved out of engagement with the member 33 and the upper end 31 of the lever out of the way of the platform 11 and thence downwardly during which movement the link 27 is moved rearwardly swinging the arms 26 rearwardly and bringing the gear 25 into mesh with the gear 24. When the gears are thus engaged a forward travel of the vehicle will, through these gears, turn the drum 18 to pull in on the forward end of the cable 19 and let out on the rear end thus causing the loaded platform 11 to move forwardly. When the gears are in mesh a notched portion 28' of the lever 28 engages a stop 26' on link 27 to limit the rearward movement of said link 27.

To automatically disengage the gears 24 and 25 after the platform 11 has been moved forward the desired distance a stop 39 on said platform strikes a finger 40 on the lever 28 at the end of the movement of the platform thereby moving the lever 28 upwardly and the link 27 forwardly disengaging the gears 24 and 25 and moving a stop 41 on the link 27 into the path of movement of the stop 39 to prevent rearward movement of the loaded platform and the lever 28 is held in this position by the finger 32 engaging the member 33 of the vehicle as shown in Fig. 5. The loading platform 11 may be readily returned to its load receiving position by pulling on the rope 35 to swing the levers into the position shown in Fig. 4 and on a rearward travel of the vehicle the platform will move rearwardly and when it reaches the position shown in Fig. 1 the gears 24 and 25 are thrown out of mesh by moving the lever 28 upwardly and consequently moving the link 27 forwardly, the parts being then in the position shown in Fig. 1.

The operation of the device in brief is as follows: With the platform 11 in the position shown in Fig. 1 at the rear of the vehicle and locked against forward movement the operator stands on the platform and builds up the load and he is within easy reach of the various parts of the platform so that he can place the hay where he wants it without having to pass it to another loader which is the usual custom in loading full length loads. As soon as the platform 11 is loaded he pulls on the rope 35 and drives the vehicle forwardly and the platform moves up to the front as shown in Fig. 4 and is locked in position as shown in Fig. 5 and then the rear half of the vehicle is loaded up. In this way it is possible to have but one man on the load while the usual custom is to use two or three hands on the load.

While in the drawings we have shown plain platforms, it will be understood that these may have siding on if desired and that we do not wish to limit ourselves to the details of construction herein set forth as we are aware various changes may be made without departing from the spirit of the invention.

What we claim as our invention is:

1. In a device of the class described, the combination with the body of a vehicle and its running gear, of a load receiving platform movably mounted thereon, means connectible with the running gear for moving said platform, and means for controlling said first mentioned means and including a medially pivoted lever, the rear end of which is movable into the path of the platform when in one position to check the movement thereof to its other position, and means connected with the other end of said lever for moving the rear end thereof out of the path of the platform to permit the operation of said first mentioned means.

2. In a device of the class described, the combination with the body of a vehicle and its running gear, of a load receiving platform movably mounted thereon, a driven gear connectible with the running gear to move said platform, and means for engaging and disengaging said driven gear with the running gear and including a link having one end connected with said driven gear, a medially pivoted lever to which the other end of said link is connected to one side of the pivot thereof, means for longitudinally alining said link and lever to urge the driven gear into connection with said running gear and means for moving said link and lever from longitudinal alinement when said platform reaches one position to disengage said driven gear.

3. In a device of the character described, the combination with the body of the vehicle and its running gear, of a load receiving platform movable lengthwise of the body, a frame swingingly suspended from the body, a drum journally mounted in the lower free end of said frame, means carried by said frame and adapted, upon the swinging thereof toward the rear, to engage the running gear and rotate said drum, a cable wound around said drum and having its ends secured to the ends of said movable platform whereby the same may be moved in either direction, spring means normally urging said drum driving means from engagement with the running gear, means for swinging the pivoted frame against action of said spring means and including a link pivotally secured at its rear end to said pivoted frame, a lever pivotally carried by the body and medially pivoted to the other end of said link, and means for moving said lever to move said link to engage the drum driving means with the running gear, said link and lever providing stop means for said movable platform.

4. A device of the class described, comprising a wheeled frame, a fixed platform and a movable platform mounted thereon, said movable platform being movable to a position over the fixed platform and to a position forming substantially a continuation thereof, a driven shaft, connections between said shaft and said movable platform for moving the same, a gear connected with said shaft and engageable with one of the wheels of said frame, a link engageable with said gear for moving the same into operative engagement with said frame wheel, means normally urging said gear to inoperative position, a lever pivotally carried by said wheeled frame for extending said link to engage the drive gear with said frame wheel, means for operating said lever, and means carried by said lever for retaining the same in its position with said drive gear in operative position.

In testimony whereof we affix our signatures.

HENRY B. FREEMAN.
GEORGE L. FREEMAN.
JOHN FREEMAN.